(12) United States Patent
Ichikawa et al.

(10) Patent No.: US 9,234,571 B2
(45) Date of Patent: Jan. 12, 2016

(54) VEHICULAR POWER TRANSMISSION DEVICE

(71) Applicant: HONDA MOTOR CO., LTD., Tokyo (JP)

(72) Inventors: Kazuki Ichikawa, Wako (JP); Soichi Sugino, Wako (JP); Shinichi Shimodaira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/413,817

(22) PCT Filed: Jul. 22, 2013

(86) PCT No.: PCT/JP2013/069800
§ 371 (c)(1),
(2) Date: Jan. 9, 2015

(87) PCT Pub. No.: WO2014/017438
PCT Pub. Date: Jan. 30, 2014

(65) Prior Publication Data
US 2015/0192193 A1 Jul. 9, 2015

(30) Foreign Application Priority Data

Jul. 23, 2012 (JP) ................. 2012-162360

(51) Int. Cl.
*F16H 29/04* (2006.01)
*F16H 3/52* (2006.01)
(Continued)

(52) U.S. Cl.
CPC .................. *F16H 29/04* (2013.01); *F16H 3/52* (2013.01); *F16H 3/60* (2013.01); *F16H 37/12* (2013.01); *B60K 2001/001* (2013.01)

(58) Field of Classification Search
CPC ............. F16H 3/52; F16H 3/60; F16H 29/04; F16H 37/082; F16H 37/0833; F16H 37/12; F16H 48/22; F16H 48/24; B60K 17/046
See application file for complete search history.

(56) References Cited

U.S. PATENT DOCUMENTS

2005/0039572 A1 2/2005 Friedmann
2006/0030447 A1 2/2006 Kita
(Continued)

FOREIGN PATENT DOCUMENTS

JP 2001-227615 A 8/2001
JP 2004-100921 A 4/2004
(Continued)

OTHER PUBLICATIONS

International Search Report dated Sep. 24, 2013, issued in corresponding application No. PCT/JP2013/069800.

*Primary Examiner* — Huan Le
(74) *Attorney, Agent, or Firm* — Westerman, Hattori, Daniels & Adrian, LLP

(57) ABSTRACT

A selector device disposed between a transmission and a differential gear includes a first output shaft connected to the transmission, a second output shaft connected to the differential gear, a third output shaft relatively rotatably fitted on an outer periphery of the second output shaft, a planetary gear mechanism having a sun gear connected to the third output shaft and a ring gear connected to the differential gear, a first meshing switching mechanism that is capable of switching between a state in which the first and third output shafts are joined and the second output shaft is detached and a state in which the first to third output shafts are joined, and a second meshing switching mechanism that is capable of joining a carrier of the planetary gear mechanism to a casing.

10 Claims, 15 Drawing Sheets

(51) Int. Cl.
 *F16H 3/60* (2006.01)
 *F16H 37/12* (2006.01)
 *B60K 1/00* (2006.01)

(56) References Cited

U.S. PATENT DOCUMENTS

2007/0021262 A1* 1/2007 Honda et al. ............... 475/204
2013/0203543 A1* 8/2013 Sten ............................. 475/150
2013/0303324 A1* 11/2013 Valente et al. ............... 475/204
2013/0303326 A1* 11/2013 Downs et al. ............... 475/221

FOREIGN PATENT DOCUMENTS

| | | |
|---|---|---|
| JP | 2005-502543 A | 1/2005 |
| JP | 2006-046468 A | 2/2006 |
| JP | 4035423 B2 | 1/2008 |
| JP | 4336448 B2 | 9/2009 |

* cited by examiner

FIG.3 TOP STATE

LOW STATE

FIG.6 LOW STATE

|  | FIRST MESHING SWITCHING MECHANISM | SECOND MESHING SWITCHING MECHANISM |
|---|---|---|
| PARKING RANGE | L | R |
| REVERSE RANGE | R | R |
| NEUTRAL RANGE | R | L |
| DRIVE RANGE | L | L |

FIG.11 PARKING RANGE

REVERSE RANGE

FIG.13 NEUTRAL RANGE

VEHICULAR POWER TRANSMISSION DEVICE

TECHNICAL FIELD

The present invention relates to a vehicular power transmission device having a selector device disposed between a transmission and a differential gear.

BACKGROUND ART

A continuously variable transmission that converts rotation of an input shaft connected to an engine into reciprocating movements having mutually different phases for a plurality of connecting rods, and converts the reciprocating movements of the plurality of connecting rods into rotation of an output shaft via a plurality of one-way clutches is known from Patent Document 1 below.

Furthermore, a three parallel shaft type automatic transmission equipped with a first input shaft, a second input shaft, and an output shaft, in which an idle gear is meshed with a reverse drive gear provided on the first input shaft and a reverse driven gear provided on the output shaft, the reverse drive gear is joined to the first input shaft via a clutch, and the reverse driven gear is joined to the output shaft via a selector, thus establishing a reverse gear position, is known from Patent Document 2 below.

Moreover, a belt type continuously variable transmission having an endless belt wound around a drive pulley provided on a main shaft and a driven pulley provided on a countershaft, in which a planetary gear type forward-reverse switching mechanism is disposed between the main shaft and the drive pulley to thus make the drive pulley rotate in reverse relative to the main shaft, thereby establishing a reverse range, is known from Patent Document 3 below.

RELATED ART DOCUMENTS

Patent Documents

Patent Document 1: Japanese Patent Publication (PCT) No. 2005-502543
Patent Document 2: Japanese Patent No. 4336448
Patent Document 3: Japanese Patent No. 4035423

SUMMARY OF THE INVENTION

Problems to be Solved by the Invention

The continuously variable transmission described in Patent Document 1 above has a structure in which reciprocating movement of the connecting rod is transmitted to the output shaft via the one-way clutch; the output shaft can therefore rotate in only one direction (forward travel direction), and it is therefore necessary to employ hybridization by connecting an electric motor to a foot shaft in order to make the vehicle travel in reverse.

In order to make a vehicle travel in reverse without using an electric motor, disposing a forward-reverse switching mechanism operated by a hydraulic clutch between the output shaft, which rotates in only one direction, and a differential gear, and reversing rotation of the output shaft and then transmitting it to the differential gear could be considered. However, if the forward-reverse switching mechanism is disposed on the downstream side of the output shaft, to which a large torque amplified by the continuously variable transmission is transmitted, in order to withstand the large torque a hydraulic clutch for the forward-reverse switching mechanism inevitably has a large capacity, and there is a possibility that the overall dimensions of the power transmission device will become large. In particular, if an attempt is made to impart to the forward-reverse switching mechanism a function of a selector device in order to establish a parking range or a neutral range, there is a possibility that the dimensions will further increase.

The present invention has been accomplished in light of the above circumstances, and it is an object thereof to reduce the size and lighten the weight of a selector device disposed between a continuously variable transmission and a differential gear by simplifying the structure.

Means for Solving the Problems

In order to attain the above object, according to a first aspect of the present invention, there is provided a vehicular power transmission device comprising a selector device disposed between a transmission and a differential gear, the selector device comprising a first output shaft connected to the transmission, a second output shaft connected to the differential gear, a third output shaft relatively rotatably fitted on an outer periphery of the second output shaft, a planetary gear mechanism comprising a first element connected to the third output shaft and a second element connected to the differential gear, a first meshing switching mechanism that is capable of switching between a state in which the first and third output shafts are joined and the second output shaft is detached and a state in which the first to third output shafts are joined, and a second meshing switching mechanism that is capable of joining a third element of the planetary gear mechanism to a casing.

Further, according to a second aspect of the present invention, in addition to the first aspect, the planetary gear mechanism has a reduction ratio from the third output shaft to the differential gear that is set to be greater than 1.

Furthermore, according to a third aspect of the present invention, in addition to the first or second aspect, the first meshing switching mechanism comprises a first inner peripheral spline meshing with a first outer peripheral spline provided on the first output shaft, and a second inner peripheral spline meshing with a second outer peripheral spline provided on the second output shaft and a third outer peripheral spline provided on the third output shaft, and the first inner peripheral spline has a diameter that is larger than the diameter of the second inner peripheral spline, a chamfer being formed on an end part, on the first inner peripheral spline side, of the second inner peripheral spline.

Moreover, according to a fourth aspect of the present invention, in addition to any one of the first to third aspects, the transmission comprises an input side fulcrum having a variable amount of eccentricity from an axis of an input shaft connected to a drive source and rotating together with the input shaft, a one-way clutch connected to the first output shaft, an output side fulcrum provided on an input member of the one-way clutch, a connecting rod having opposite ends connected to the input side fulcrum and the output side fulcrum and moving reciprocatingly, and a shift actuator for changing an amount of eccentricity of the input side fulcrum.

Further, according to a fifth aspect of the present invention, in addition to the fourth aspect, when the first and third output shafts are joined and the second output shaft is detached by the first meshing switching mechanism, the third element is detached from the casing by the second meshing switching mechanism, and the second output shaft is in a rotating state, if a rotational direction of the second output shaft is a first direction, the amount of eccentricity is controlled so that a rotational speed of the first output shaft is not greater than a rotational speed of the second output shaft, and if the rotational direction of the second output shaft is a second direction, the amount of eccentricity is controlled so that the absolute value of the rotational speed of the third element is not greater than a predetermined rotational speed.

It should be noted here that an eccentric disk 18 of an embodiment corresponds to the input side fulcrum of the present invention, a pin 19c of the embodiment corresponds to the output side fulcrum of the present invention, an outer member 22 of the embodiment corresponds to the input member of the one-way clutch of the present invention, a sun gear 43 of the embodiment corresponds to the first element of the present invention, a carrier 44 of the embodiment corresponds to the third element of the present invention, a ring gear 45 of the embodiment corresponds to the second element of the present invention, an engine E of the embodiment corresponds to the drive source of the present invention, and a continuously variable transmission T of the embodiment corresponds to the transmission of the present invention.

Effects of the Invention

In accordance with the first aspect of the present invention, when the first meshing switching mechanism integrally joins the first to third output shafts, and the second meshing switching mechanism joins the third element of the planetary gear mechanism to the casing, the differential gear is joined to the locked planetary gear mechanism, and a parking range is established. When the first meshing switching mechanism joins the first and third output shafts, joining of the second meshing switching mechanism is released, and the second meshing switching mechanism joins the third element of the planetary gear mechanism to the casing, the driving force of the first output shaft is reversed in rotation by means of the planetary gear mechanism and is transmitted to the differential gear, and a reverse range is established. When the first meshing switching mechanism joins the first and third output shafts, joining of the second meshing switching mechanism is released, and the second meshing switching mechanism releases the third element of the planetary gear mechanism, the differential gear idles together with the planetary gear mechanism, and a neutral range is established. When the first meshing switching mechanism integrally joins the first to third output shafts and the second meshing switching mechanism releases the third element of the planetary gear mechanism, the driving force of the first output shaft is transmitted to the differential gear via the second output shaft or via the third output shaft and the are integrally rotating planetary gear mechanism, and a drive range is established.

Since rotation of an input shaft connected to a drive source is decreased in speed by the transmission, the transmission torque of the first to third output shafts on the downstream side of the transmission becomes large, but it becomes possible to switch between the four ranges by means of the first and second meshing switching mechanisms of the selector device without blocking the transmission of torque to the output shaft due to provision of a torque converter and a starting clutch on the transmission and without requiring a large capacity hydraulic clutch or electromagnetic clutch, thus enabling a small size and light weight to be achieved for the power transmission device.

Furthermore, in accordance with the second aspect of the present invention, since, with regard to the planetary gear mechanism, the reduction ratio from the third output shaft to the differential gear is set so as to be greater than 1, the gear ratio of a reverse gear position can be acquired by the planetary gear mechanism. The transmission torque becomes large due to a high gear ratio in the reverse gear position, but due to the first meshing switching mechanism being provided on the upstream side of the planetary gear mechanism, only a relatively small transmission torque, before being increased by the planetary gear mechanism, acts on the first meshing switching mechanism and switching thereof can be carried out smoothly with a low thrust.

Moreover, in accordance with the third aspect of the present invention, the first meshing switching mechanism includes the first inner peripheral spline meshing with the first outer peripheral spline provided on the first output shaft, and the second inner peripheral spline meshing with the second outer peripheral spline provided on the second output shaft and the third outer peripheral spline provided on the third output shaft. Since the chamfer is formed on the end part, on the first inner peripheral spline side, of the second inner peripheral spline, not only is it possible to easily engage the second inner peripheral spline with the second outer peripheral spline due to the wedge action of the chamfer, but it is also possible to produce the chamfer of the second inner peripheral spline by casting or forging without interfering with the first inner peripheral spline since the diameter of the first inner peripheral spline is larger than the diameter of the second inner peripheral spline, and compared with a case in which it is produced by machining, the cost can be reduced.

Furthermore, in accordance with the fourth aspect of the present invention, when the input shaft connected to the drive source rotates, the eccentric disk of the transmission unit rotates eccentrically, and when the connecting rod connected to one end of the eccentric disk moves reciprocatingly, the output shaft rotates via the one-way clutch, to which is connected the other end of the connecting rod. When the amount of eccentricity of the eccentric disk relative to the input shaft is changed by the shift actuator, since the reciprocating stroke of the connecting rod changes, the rotational angle of the output shaft changes, and the gear ratio is changed. Since such a transmission cannot rotate the first output shaft in reverse, the first output shaft cannot be rotated in reverse by providing the selector device for forward-reverse switching further on the drive source side than the input shaft, but by disposing the selector device further on the downstream side than the first output shaft forward-reverse switching can be carried out without problems.

Moreover, in accordance with the fifth aspect of the present invention, in a state in which the first and third output shafts are joined by means of the first meshing switching mechanism to thus detach the second output shaft, the third element is detached from the casing by means of the second meshing switching mechanism, the second output shaft is in a rotating state, and the vehicle is coasting in the neutral range, if the rotational direction of the second output shaft is the first direction, since the amount of eccentricity is controlled so that the rotational speed of the first output shaft becomes no greater than the rotational speed of the second output shaft, when the drive range is established by the first meshing switching mechanism joining the first, second, and third output shafts, not only is it possible to prevent the occurrence of torque shock due to the driving force being suddenly transmitted from the drive source side to the differential gear side, but it is also possible to prevent the spline of the first meshing switching mechanism from being damaged. Furthermore, if the rotational direction of the second output shaft is the second direction, since the amount of eccentricity is controlled so that the absolute value of the rotational speed of the third element is not greater than a predetermined rotational speed, when the reverse range is established by joining the third element to the casing by means of the second meshing switching mechanism, not only is it possible to prevent the occurrence of torque shock by decreasing the differential rotation between the casing and the third element, but it is also possible to prevent the spline of the second meshing switching mechanism from being damaged.

EXPLANATION OF REFERENCE NUMERALS AND SYMBOLS

Figure 1:
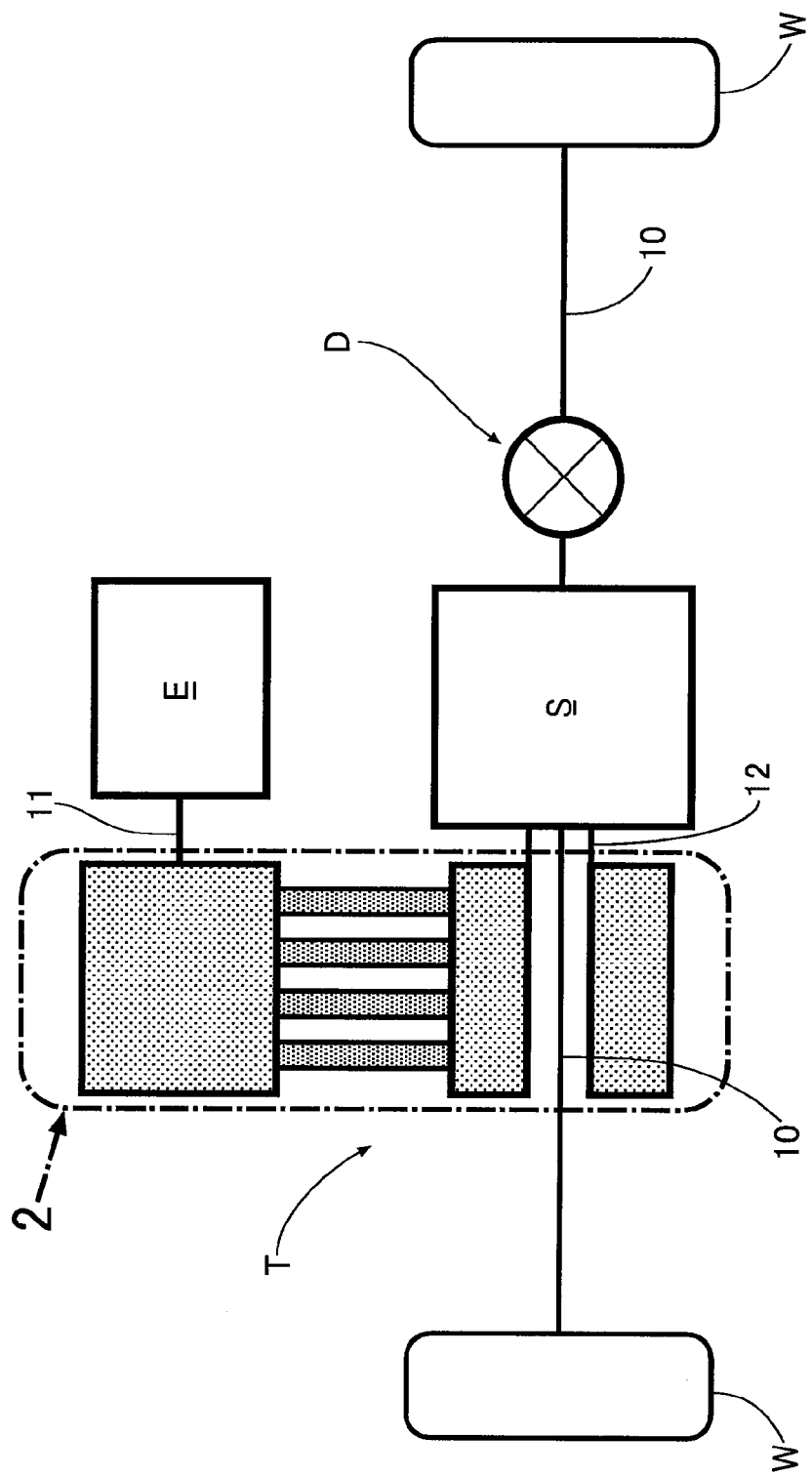
FIG. 1 is a skeleton diagram of a vehicular travel power device (first embodiment).

11 Input shaft
12 First output shaft
12a First outer peripheral spline
14 Shift actuator
18 Eccentric disk (input side fulcrum)
19 Connecting rod
19c Pin (output side fulcrum)
21 One-way clutch
22 Outer member (input member)
31 Second output shaft
32 Third output shaft
32a Third outer peripheral spline
34a Second outer peripheral spline
35 First meshing switching mechanism
36a First inner peripheral spline
36b Second inner peripheral spline
36c Chamfer
42 Planetary gear mechanism
43 Sun gear (first element)
44 Carrier (third element)
45 Ring gear (second element)
50 Casing
51 Second meshing switching mechanism
D Differential gear
E Engine (drive source)
S Selector device
T Continuously variable transmission (transmission)
$\epsilon$ Amount of eccentricity

MODES FOR CARRYING OUT THE INVENTION

A mode for carrying out the present invention is explained by reference to FIG. 1 to FIG. 16.

First Embodiment

As shown in FIG. 1, a vehicular power transmission device for transmitting the driving force of an engine E to driven wheels W and W via left and right axles 10 and 10 includes a continuously variable transmission T, a selector device S, and a differential gear D. The selector device S can switch between a parking range, a reverse range, a neutral range, and a drive range.

The structure of the continuously variable transmission T is now explained by reference to FIGS. 2 to 6.

Figure 2:
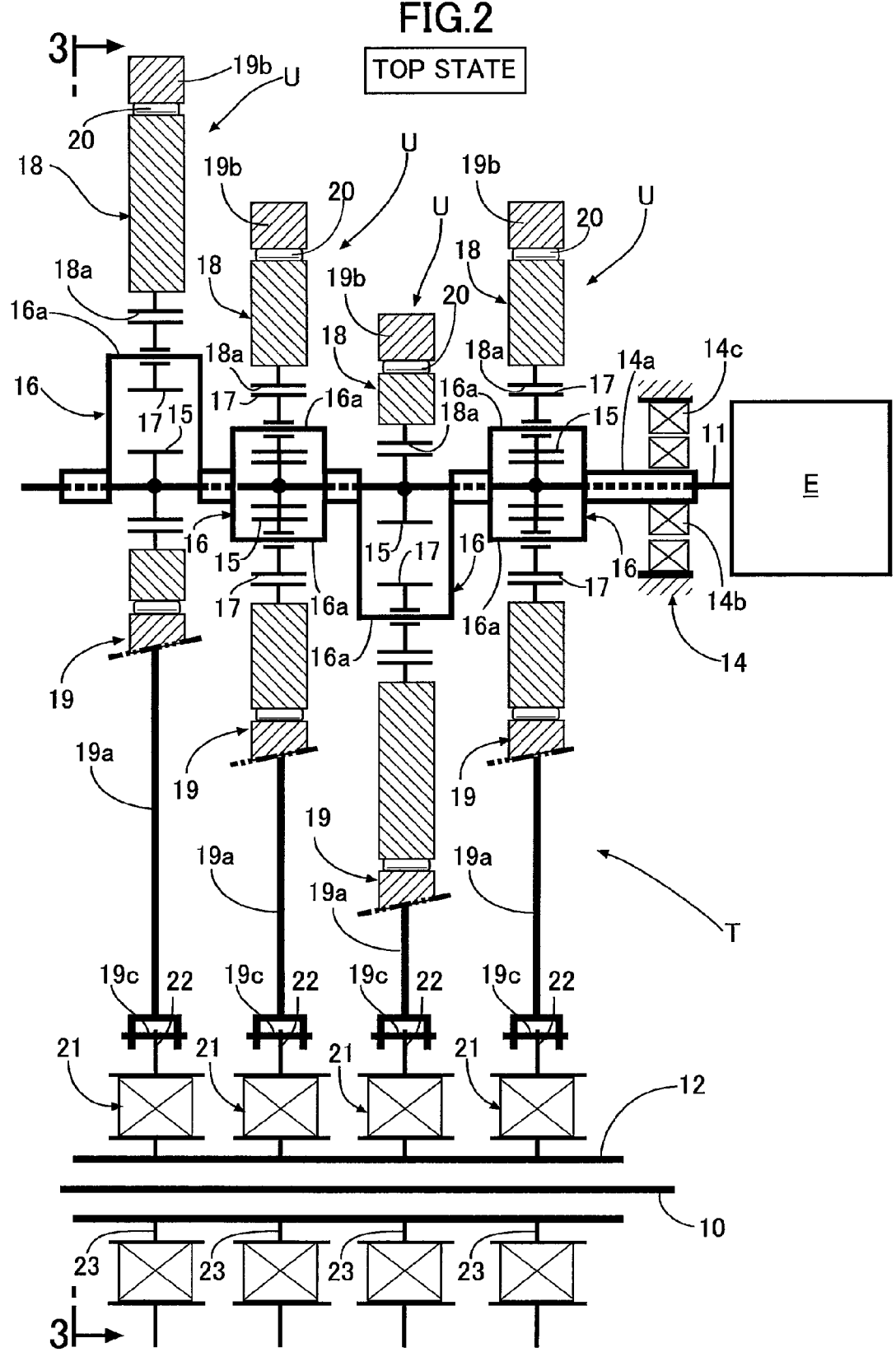
FIG. 2 is a detailed diagram of part 2 in FIG. 1 (first embodiment).
Figure 3:
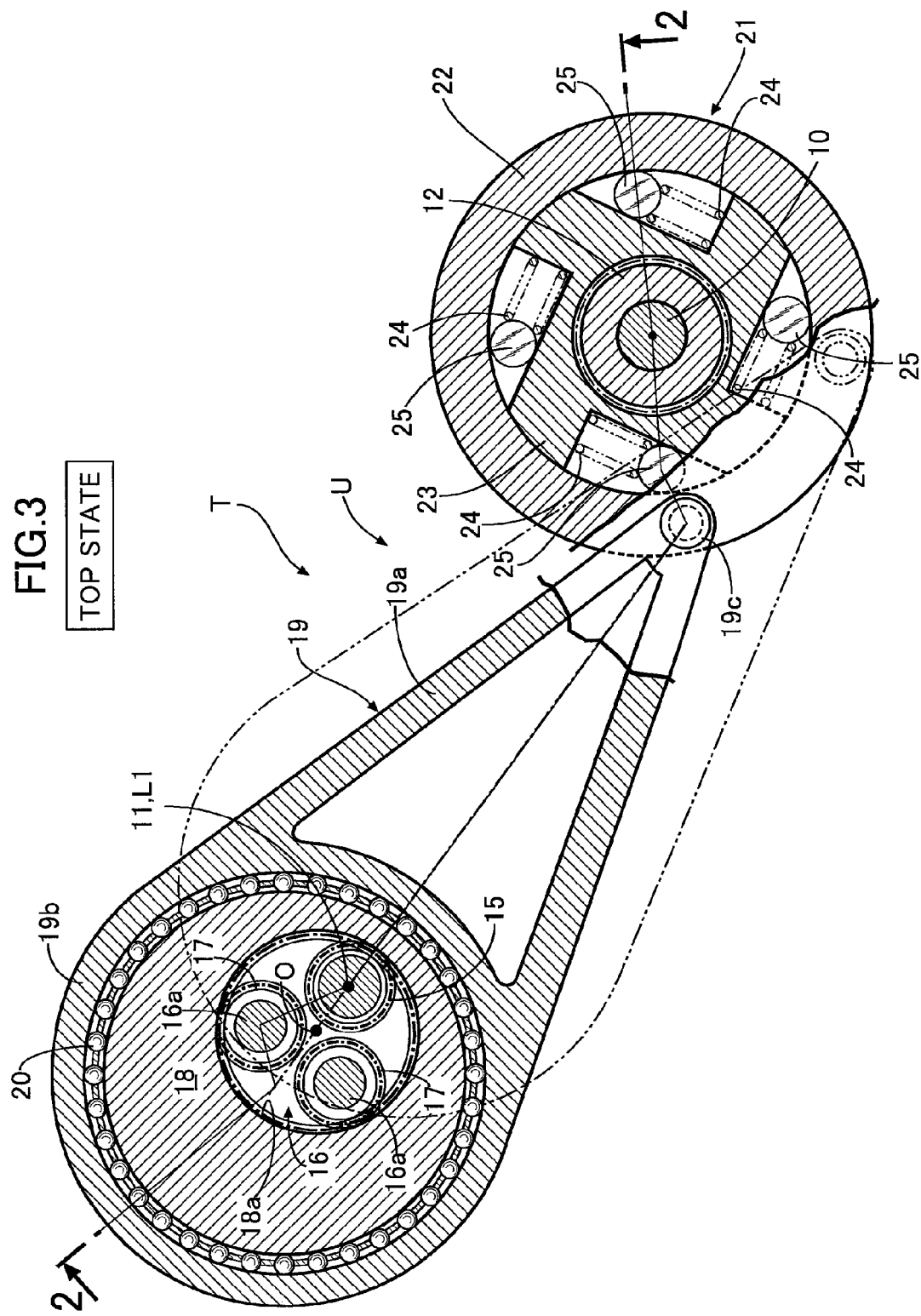
FIG. 3 is a sectional view (TOP state) along line 3-3 in FIG. 2 (first embodiment).

As shown in FIG. 2 and FIG. 3, the continuously variable transmission T of the present embodiment has a plurality (four in the embodiment) of transmission units U having the same structure superimposed on one another in the axial direction; these transmission units U include a common input shaft 11 and a common first output shaft 12 disposed in parallel to each other, and rotation of the input shaft 11 is reduced in speed or increased in speed and transmitted to the first output shaft 12.

The structure of one transmission unit U is explained below as being representative thereof. The input shaft 11, which is connected to the engine E and rotates, extends relatively rotatably through the interior of a hollow rotating shaft 14a of a shift actuator 14 such as an electric motor. A rotor 14b of the shift actuator 14 is fixed to the rotating shaft 14a, and a stator 14c is fixed to a casing. The rotating shaft 14a of the shift actuator 14 can rotate at the same speed as that of the input shaft 11 and can rotate at a different speed relative to the input shaft 11.

A first pinion 15 is fixed to the input shaft 11, which extends through the rotating shaft 14a of the shift actuator 14, and a crank-shaped carrier 16 is connected to the rotating shaft 14a of the shift actuator 14 so as to straddle the first pinion 15. Two second pinions 17 and 17 having the same diameter as that of the first pinion 15 are each supported via pinion pins 16a and 16a at positions forming an equilateral triangle in cooperation with the first pinion 15, and a ring gear 18a eccentrically formed in the interior of a circular plate-shaped eccentric disk 18 meshes with the first pinion 15 and the second pinions 17 and 17. A ring portion 19b provided at one end of a rod portion 19a of a connecting rod 19 is relatively rotatably fitted onto an outer peripheral face of the eccentric disk 18 via a ball bearing 20.

A one-way clutch 21 provided on the outer periphery of the first output shaft 12 includes a ring-shaped outer member 22 pivotably supported on the rod portion 19a of the connecting rod 19 via a pin 19c, an inner member 23 disposed in the interior of the outer member 22 and fixed to the first output shaft 12, and rollers 25 disposed in a wedge-shaped space formed between an arc face on the inner periphery of the outer member 22 and a flat plane on the outer periphery of the inner member 23 and urged by means of springs 24.

As is clear from FIG. 2, the four transmission units U share the crank-shaped carrier 16, but the phase of each eccentric disk 18 supported on the carrier 16 via the second pinions 17 and 17 is different by 90° for each transmission unit U. For example, in FIG. 2, the eccentric disk 18 of the transmission unit U at the left-hand end is displaced upward relative to the input shaft 11 in the drawing, the eccentric disk 18 of the transmission unit U third from the left is displaced downward relative to the input shaft 11 in the drawing, and the eccentric disks 18 and 18 of the transmission units U and U second and fourth from the left are positioned in the middle in the vertical direction.

Figure 7:
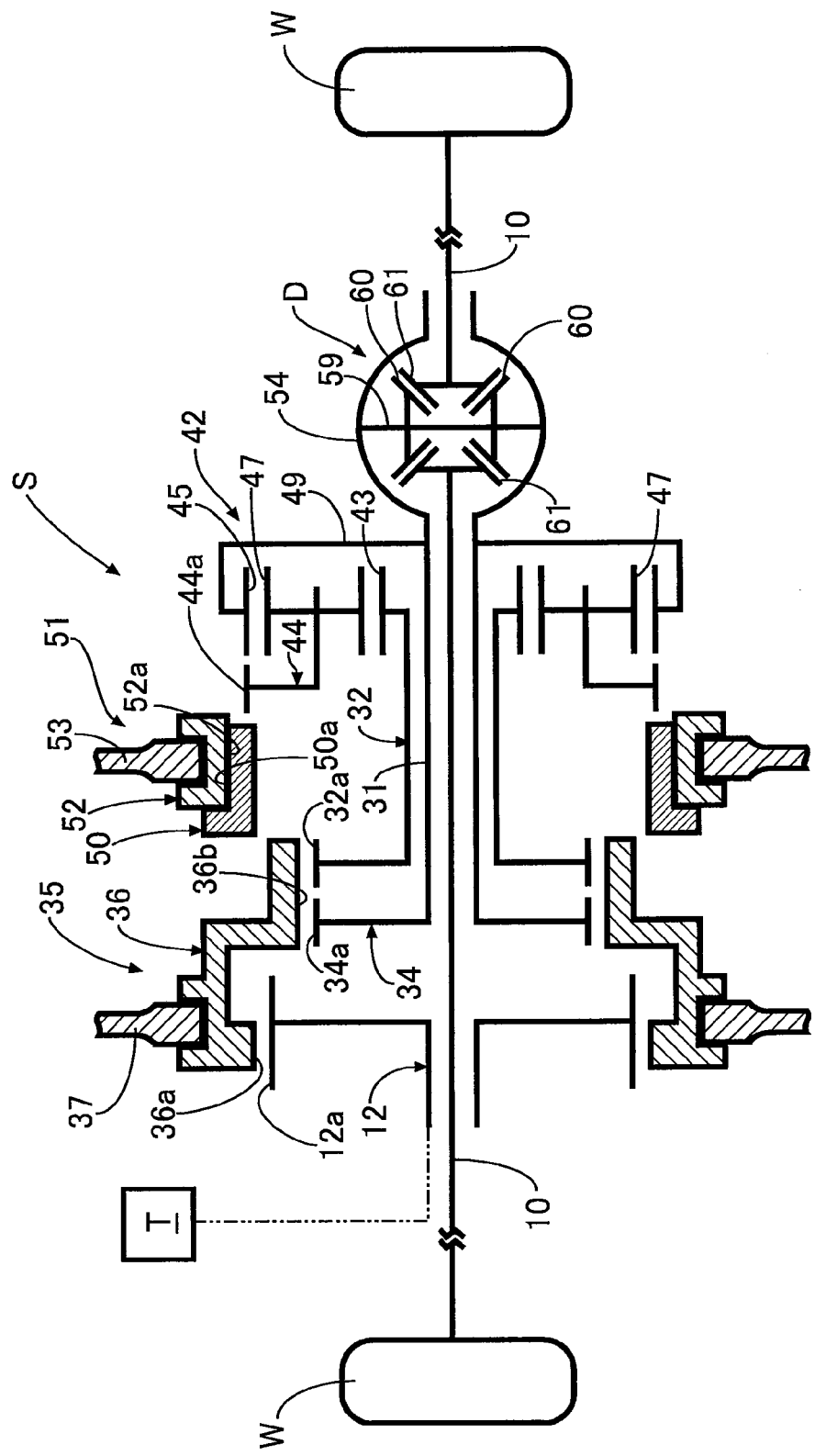
FIG. 7 is a skeleton diagram of a selector device and a differential gear (first embodiment).
Figure 8:
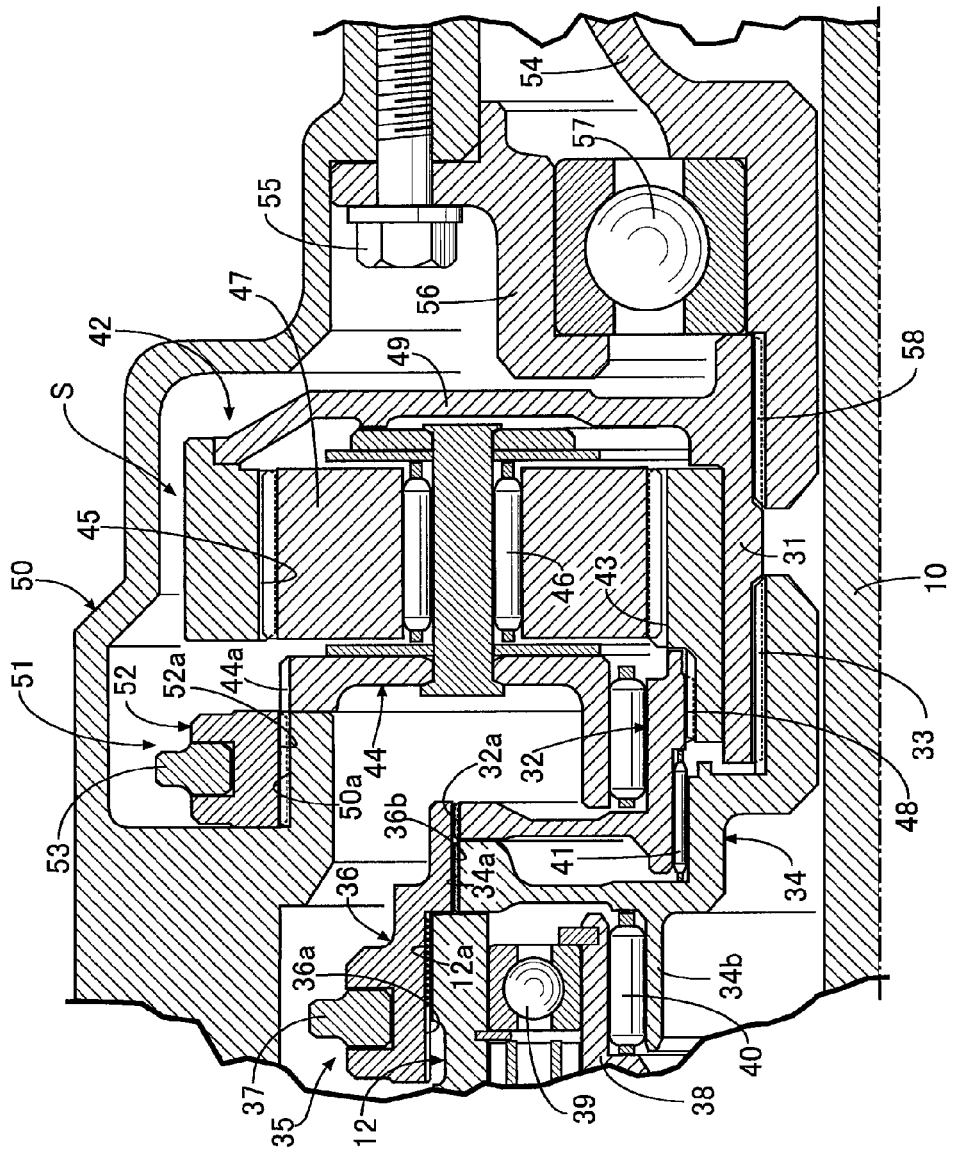
FIG. 8 is a vertical sectional view of the selector device (first embodiment).

The structures of the selector device S and the differential gear D are now explained by reference to FIG. 7 and FIG. 8.

The selector device S includes, in addition to the tubular first output shaft 12 relatively rotatably fitted onto the outer periphery of the axle 10, a tubular second output shaft 31 relatively rotatably fitted onto the outer periphery of the axle 10 and a tubular third output shaft 32 relatively rotatably fitted onto the outer periphery of the second output shaft 31. A first outer peripheral spline 12a is formed at the right-hand end of the first output shaft 12. A first connecting member 34 is joined to the left-hand end of the second output shaft 31 via a spline join 33, and a second outer peripheral spline 34a is formed at the extremity of the first connecting member 34, which extends leftwardly in the axial direction and radially outwardly. A third outer peripheral spline 32a is formed at a position that extends radially outwardly from the left-hand end in the axial direction of the third output shaft 32. The reason that the second output shaft 31 and the first connecting member 34 are separate members is because of ease of assembly; the second output shaft 31 and the first connecting member 34 may be formed from one member and the second outer peripheral spline 34a may be formed directly on the second output shaft 31.

The first outer peripheral spline 12a, the second outer peripheral spline 34a, and the third outer peripheral spline 32a forming a first meshing switching mechanism 35, which is a dog clutch, are aligned in the axial direction, and the external diameters of the second outer peripheral spline 34a and the third outer peripheral spline 32a are equal to each other but smaller than the external diameter of the first outer peripheral spline 12a. A sleeve 36 of the first meshing switching mechanism 35 includes a first inner peripheral spline 36a having a large external diameter and a second inner peripheral spline 36b having a small external diameter; the first inner peripheral spline 36a always meshes with the first outer peripheral spline 12a, the second inner peripheral spline 36b always meshes with the third outer peripheral spline 32a, and the second inner peripheral spline 36b meshes with the second outer peripheral spline 34a only when moved to the left as shown in FIG. 8. That is, when the sleeve 36 is moved by a fork 37 to the right from the leftwardly moved state shown in FIG. 8, meshing between the second inner peripheral spline 36b and the second outer peripheral spline 34a is released.

In addition, a ball bearing 39 is disposed between a casing 38 and the first output shaft 12, a needle bearing 40 is disposed between the casing 38 and a flange portion 34b of the first connecting member 34, and a needle bearing 41 is disposed between the first connecting member 34 and the third output shaft 32.

A planetary gear mechanism 42 includes a sun gear 43 as a first element, a carrier 44 as a third element, a ring gear 45 as a second element, and a plurality of pinions 47 relatively rotatably supported on the carrier 44 via a needle bearing 46, the pinions 47 meshing with the sun gear 43 and the ring gear 45. The left-hand end of the sun gear 43 is joined to the right-hand end of the third output shaft 32 via a spline join 48, and the ring gear 45 is connected to an outer peripheral part of a second connecting member 49 extending radially outwardly from the right-hand end of the second output shaft 31.

An inner peripheral spline 52a formed on a sleeve 52 of a second meshing switching mechanism 51, which is a dog clutch, meshes with an outer peripheral spline 44a formed on an outer peripheral part of the carrier 44 and an outer peripheral spline 50a formed on a casing 50. Therefore, when the sleeve 52 is moved leftwardly by a fork 53 to the position shown in FIG. 8, the carrier 44 is detached from the casing 50, and when the sleeve 52 is moved rightwardly by the fork 53 from the position shown in FIG. 8, the carrier 44 is joined to the casing 50.

A differential case 54 forming an outer shell of the differential gear D is rotatably supported by means of a ball bearing 57 fixed to the transmission case 50 by a bolt 55 and a bearing holder 56. The left-hand end of the differential case 54 is joined to the right-hand end of the second output shaft 31 via a spline join 58. The differential gear D includes a pair of pinions 60 and 60 rotatably supported on a pinion shaft 59 fixed to the differential case 54, and side gears 61 and 61 fixedly provided on end parts of the axles 10 and 10 and meshing with the pinions 60 and 60.

The operation of the embodiment of the present invention having the above arrangement is now explained.

First, the operation of one transmission unit U of the continuously variable transmission T is explained. When the rotating shaft 14a of the shift actuator 14 is rotated relative to the input shaft 11, the carrier 16 rotates around an axis L1 of the input shaft 11. In this process, a center O of the carrier 16, that is, the center of the equilateral triangle formed by the first pinion 15 and the two second pinions 17 and 17, rotates around the axis L1 of the input shaft 11.

Figure 4:
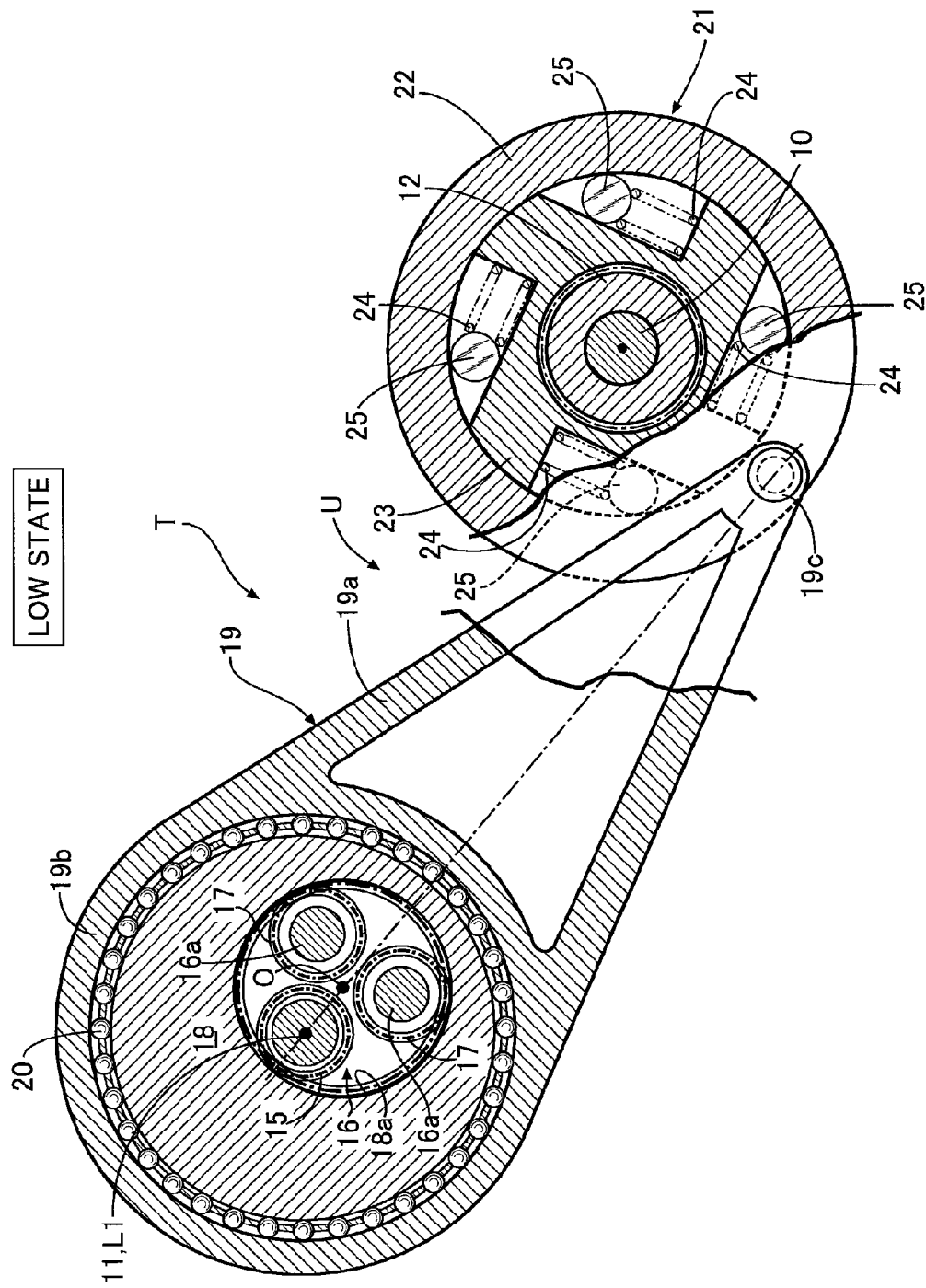
FIG. 4 is a sectional view (LOW state) along line 3-3 in FIG. 2 (first embodiment).
Figure 5:
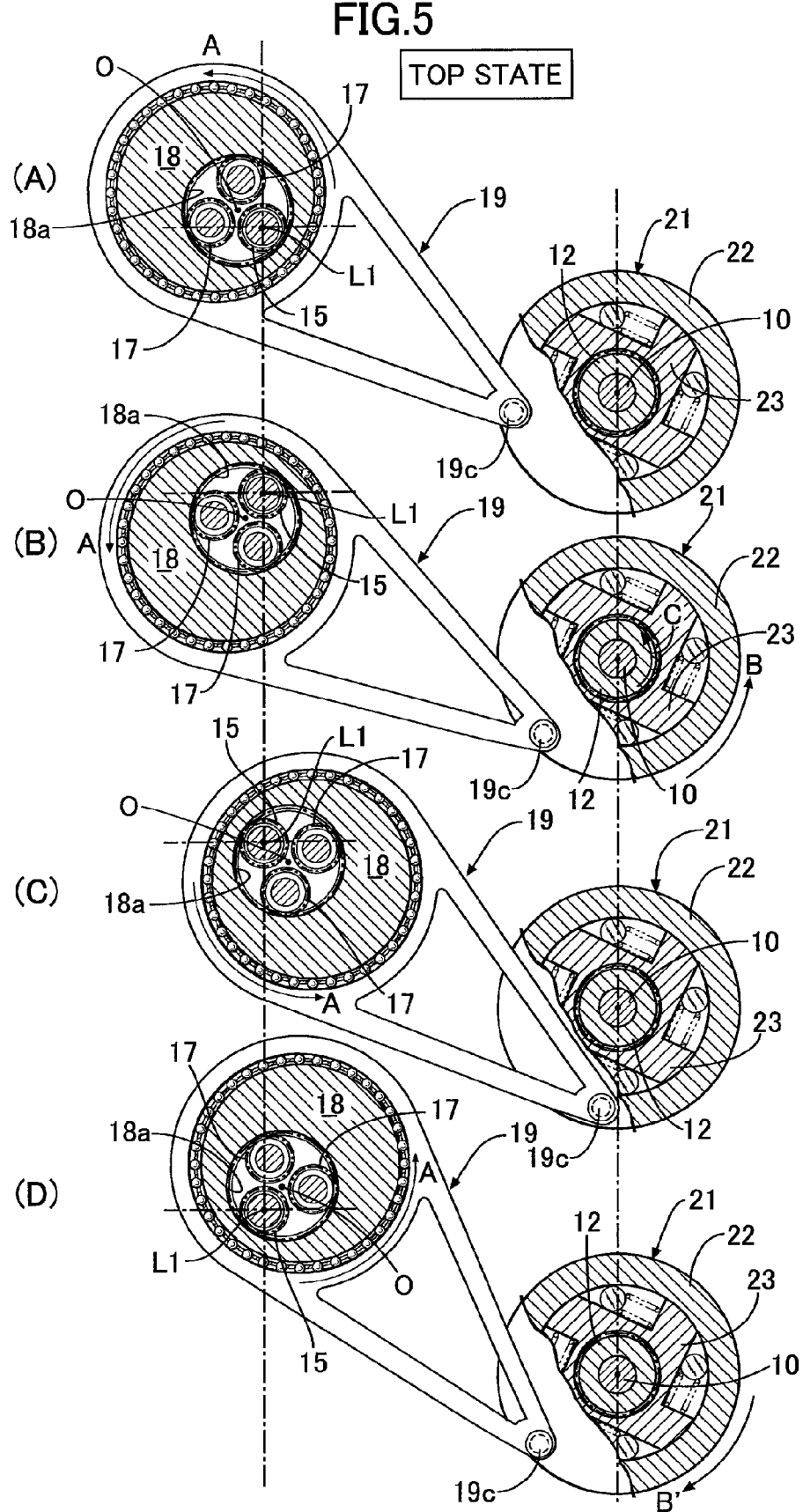
FIG. 5 is a diagram for explaining the operation in the TOP state (first embodiment).
Figure 6:
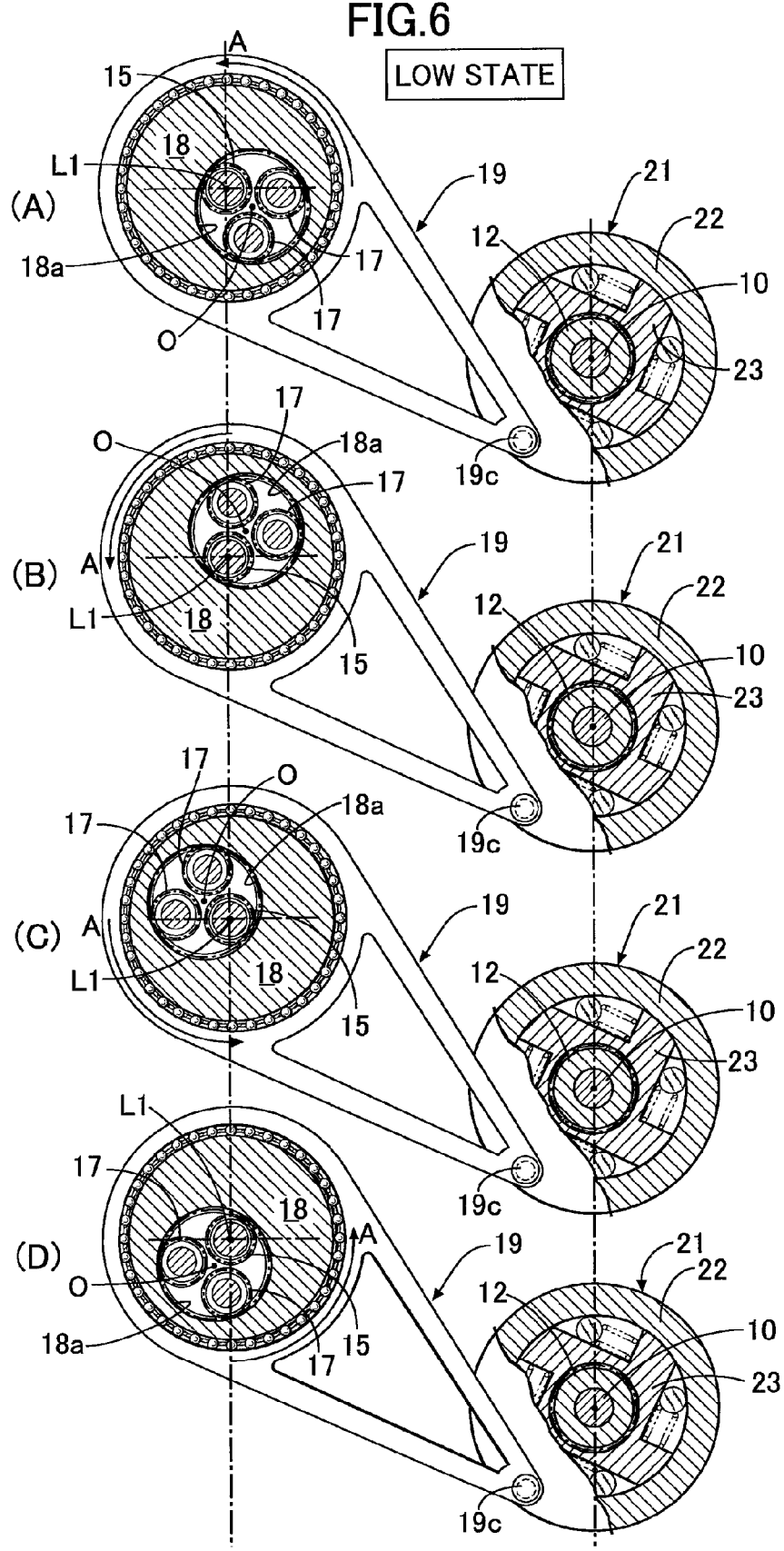
FIG. 6 is a diagram for explaining the operation in the LOW state (first embodiment).

FIG. 3 and FIG. 5 show a state in which the center O of the carrier 16 is present on the side opposite to the first output shaft 12 with respect to the first pinion 15 (that is, the input shaft 11); in this process the amount of eccentricity of the eccentric disk 18 relative to the input shaft 11 becomes a maximum, and the ratio of the continuously variable transmission T attains a TOP state. FIG. 4 and FIG. 6 show a state in which the center O of the carrier 16 is present on the same side as the first output shaft 12 with respect to the first pinion 15 (that is, the input shaft 11); in this process the amount of eccentricity of the eccentric disk 18 relative to the input shaft 11 becomes a minimum, and the ratio of the continuously variable transmission T attains a LOW state.

When in the TOP state shown in FIG. 5 the input shaft 11 is rotated by the engine E and the rotating shaft 14a of the shift actuator 14 is rotated at the same speed as that of the input shaft 11; in a state in which the input shaft 11, the rotating shaft 14a, the carrier 16, the first pinion 15, the two second pinions 17 and 17, and the eccentric disk 18 are integrated, they rotate eccentrically in the counterclockwise direction (see arrow A) with the input shaft 11 as the center. While rotating from FIG. 5 (A) to FIG. 5 (B) and then to the state of FIG. 5 (C), the connecting rod 19, which has the ring portion 19b relatively rotatably supported on the outer periphery of the eccentric disk 18 via the ball bearing 20, rotates the outer member 22, which is pivotably supported at the extremity of the rod portion 19a by means of the pin 19c, in the counterclockwise direction (see arrow B). FIG. 5 (A) and FIG. 5 (C) denote opposite ends of rotation in the arrow B direction of the outer member 22.

When the outer member 22 rotates in the arrow B direction in this way, the rollers 25 bite into the wedge-shaped space between the outer member 22 and the inner member 23 of the one-way clutch 21, rotation of the outer member 22 is transmitted to the first output shaft 12 via the inner member 23, and the first output shaft 12 therefore rotates in the counterclockwise direction (see arrow C).

When the input shaft 11 and the first pinion 15 rotate further, the eccentric disk 18 having the ring gear 18a meshing with the first pinion 15 and the second pinions 17 and 17 rotates eccentrically in the counterclockwise direction (see arrow A). While rotating from FIG. 5 (C) to FIG. 5 (D) and then to the state of FIG. 5 (A), the connecting rod 19 having the ring portion 19b relatively rotatably supported on the outer periphery of the eccentric disk 18 via the ball bearing 20 rotates the outer member 22, which is pivotably supported at the extremity of the rod portion 19a by means of the pin 19c, in the clockwise direction (see arrow B'). FIG. 5 (C) and FIG. 5 (A) denote opposite ends of rotation in the arrow B' direction of the outer member 22.

When the outer member 22 rotates in the arrow B' direction in this way, the rollers 25 are pushed out from the wedge-shaped space between the outer member 22 and the inner member 23 while compressing the springs 24, the outer member 22 slips against the inner member 23, and the first output shaft 12 does not rotate.

As hereinbefore described, when the outer member 22 rotates reciprocatingly, since the first output shaft 12 rotates in the counterclockwise direction (see arrow C) only when the rotational direction of the outer member 22 is the counterclockwise direction (see arrow B), the first output shaft 12 rotates intermittently.

FIG. 6 shows the operation when the continuously variable transmission T is run in the LOW state. In this process, since the position of the input shaft 11 coincides with the center of the eccentric disk 18, the amount of eccentricity of the eccentric disk 18 relative to the input shaft 11 becomes zero. When in this state the input shaft 11 is rotated by the engine E and the rotating shaft 14a of the shift actuator 14 is rotated at the same speed as that of the input shaft 11; in a state in which the input shaft 11, the rotating shaft 14a, the carrier 16, the first pinion 15, the two second pinions 17 and 17, and the eccentric disk 18 are integrated, they rotate eccentrically in the counterclockwise direction (see arrow A) with the input shaft 11 as a center. However, since the amount of eccentricity of the eccentric disk 18 is zero, the stroke of reciprocating movement of the connecting rod 19 also becomes zero, and the first output shaft 12 does not rotate.

Therefore, setting the position of the carrier 16 between the TOP state of FIG. 3 and the LOW state of FIG. 4 by driving the shift actuator 14 enables running at any ratio between a ratio of zero and a predetermined ratio.

Since, with regard to the continuously variable transmission T, the phases of the eccentric disks 18 of the four transmission units U disposed side by side are displaced from each other by 90°, transmitting the driving force in turn from the four transmission units U, that is, putting at least one of the four one-way clutches 21 in an engaged state at any moment, enables the first output shaft 12 to be rotated continuously.

The operation of the selector device S, which switches between the parking range, the reverse range, the neutral range, and the drive range is now explained.

Figures 9, 10:
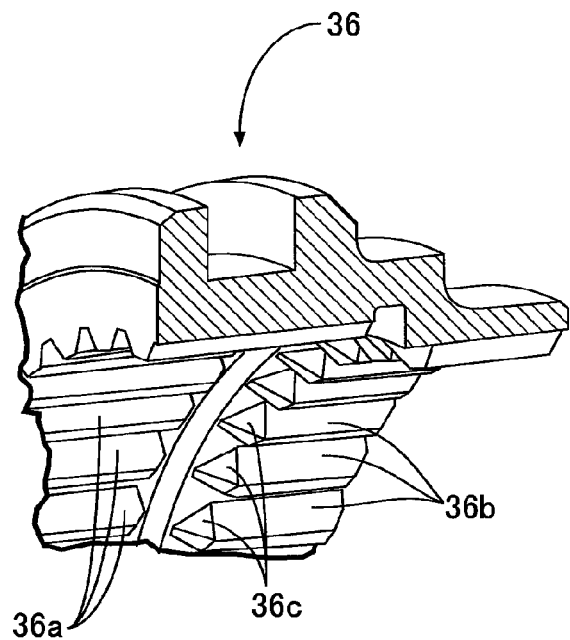
FIG. 9 is a perspective view of an inner peripheral face of a sleeve of a first meshing switching mechanism (first embodiment).
FIG. 10 is a table for engagement of first and second meshing switching mechanisms (first embodiment).
Figure 11:
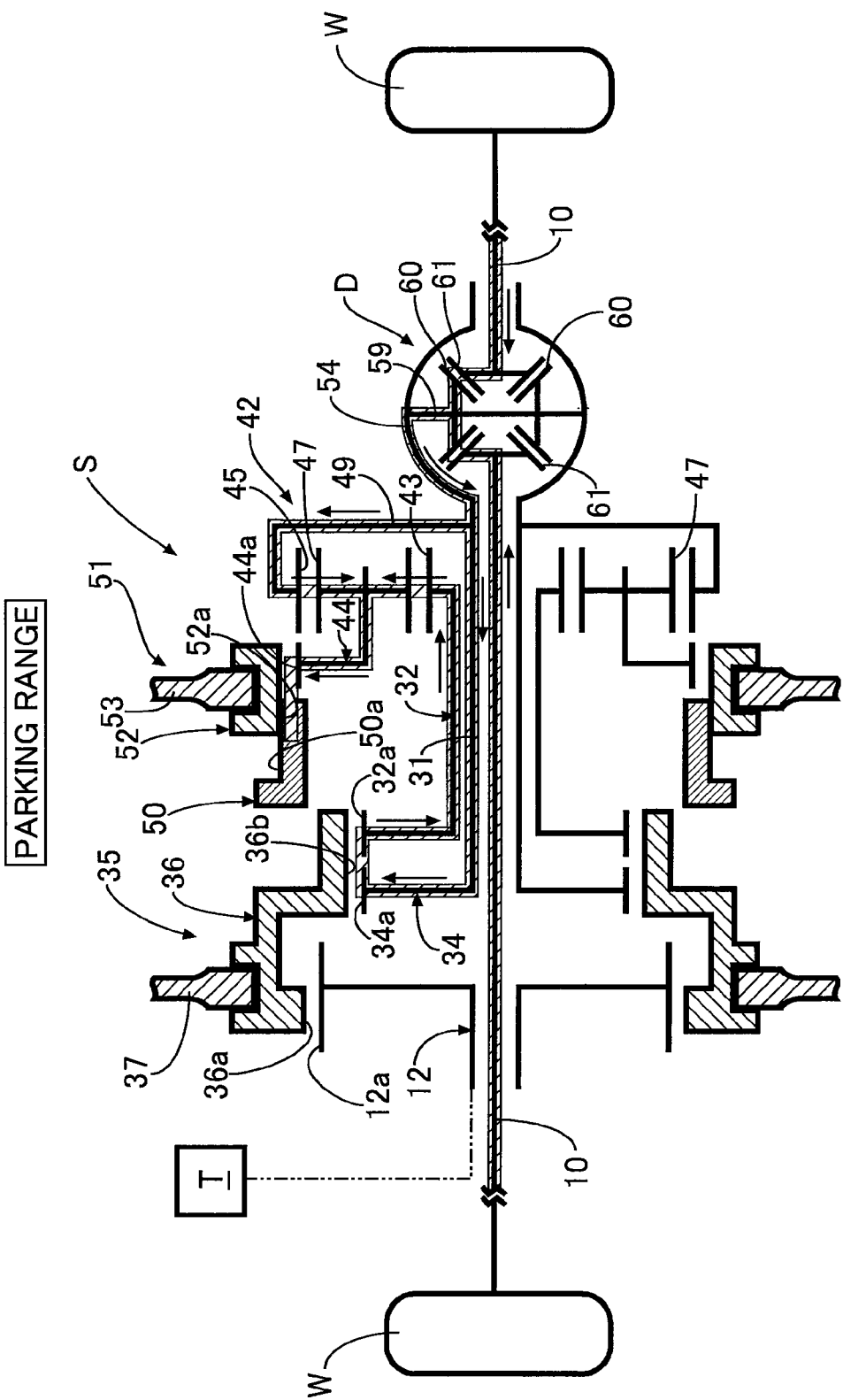
FIG. 11 is a torque flow diagram in a parking range (first embodiment).

As shown in FIG. 10 and FIG. 11, when the sleeve 36 of the first meshing switching mechanism 35 is moved to the left, the first output shaft 12, the second output shaft 31, and the third output shaft 32 are thus joined integrally, and the sleeve 52 of the second meshing switching mechanism 51 is moved to the right to thus join the carrier 44 of the planetary gear mechanism 42 to the casing 50, the parking range is established.

In the parking range, the second output shaft 31, which is integral with the differential case 54, is jointed to the ring gear 45 of the planetary gear mechanism 42 via the second connecting member 49, the second output shaft 31 is connected to the sun gear 43 of the planetary gear mechanism 42 via the first connecting member 34, the first meshing switching mechanism 35, and the third output shaft 32 and, furthermore, the carrier 44 of the planetary gear mechanism 42 is joined to the casing 50 via the second meshing switching mechanism 51. As a result, the planetary gear mechanism 42 attains a locked state, and the driven wheels W and W connected thereto via the differential gear D are non-rotatably restrained.

Figure 12:
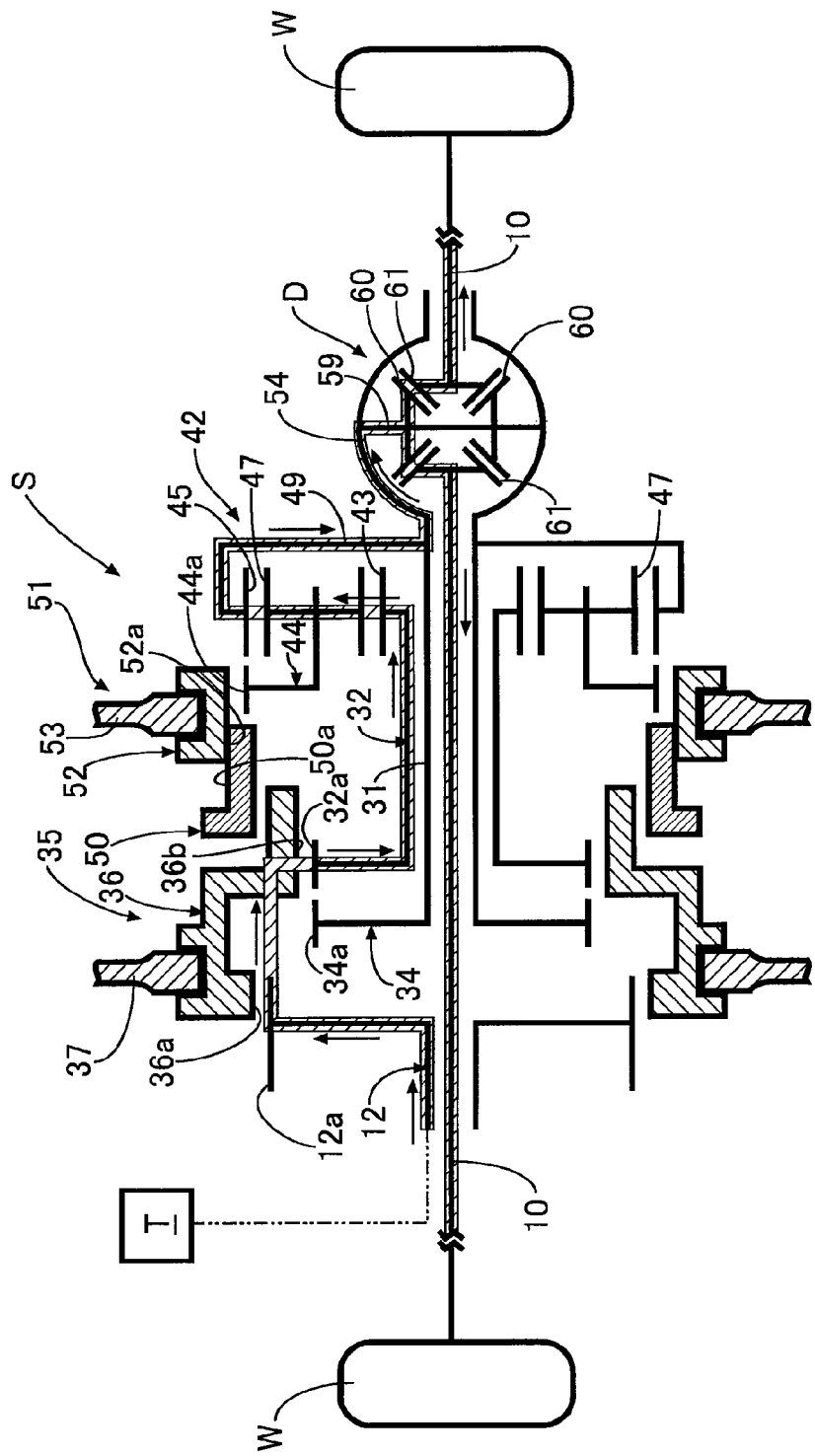
FIG. 12 is a torque flow diagram in a reverse range (first embodiment).

As shown in FIG. 10 and FIG. 12, when the sleeve 36 of the first meshing switching mechanism 35 is moved to the right, the first output shaft 12 and the third output shaft 32 are thus joined and the second output shaft 31 is detached, and the sleeve 52 of the second meshing switching mechanism 51 is moved to the right to thus join the carrier 44 of the planetary gear mechanism 42 to the casing 50, the reverse range is established.

In the reverse range, the driving force outputted from the continuously variable transmission T to the first output shaft 12 is transmitted to the differential case 54 via the path: first meshing switching mechanism 35→third output shaft 32→sun gear 43→carrier 44→ring gear 45→second connecting member 49, and at the same time it is reduced in speed and reversed in rotation in the planetary gear mechanism 42, thus enabling the vehicle to be made to run in reverse.

Figure 13:
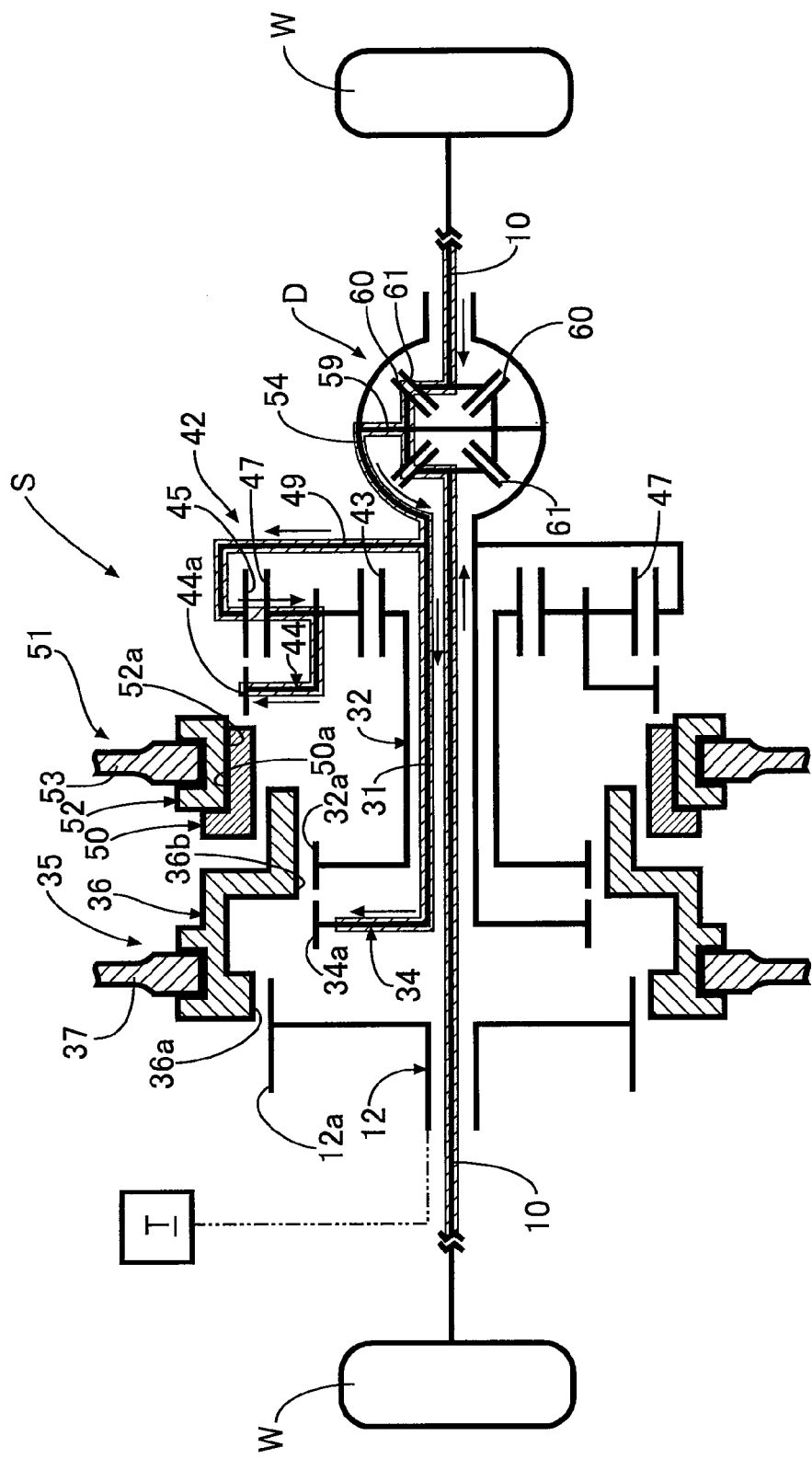
FIG. 13 is a torque flow diagram in a neutral range (first embodiment).

As shown in FIG. 10 and FIG. 13, when the sleeve 36 of the first meshing switching mechanism 35 is moved to the right, the first output shaft 12 and the third output shaft 32 are thus joined and the second output shaft 31 is detached, and the sleeve 52 of the second meshing switching mechanism 51 is moved to the left to thus detach the carrier 44 of the planetary gear mechanism 42 from the casing 50, the neutral range is established.

In the neutral range, since the carrier 44 of the planetary gear mechanism 42 is detached from the casing 50, the ring gear 45 and the second connecting member 49 can rotate freely, and since the first connecting member 34 is detached from the first meshing switching mechanism 35, the second output shaft 31 can rotate freely, the differential case 54 connected to the second connecting member 49 and the second output shaft 31 can rotate freely, and the driven wheels W and W attain a non-restrained state. In this state, the driving force of the engine E is transmitted from the continuously variable transmission T to the sun gear 43 via the path: first output shaft 12→first meshing switching mechanism 35→third output shaft 32, but since the carrier 44 is not restrained, the planetary gear mechanism 42 idles, and the driving force is not transmitted to the differential gear D.

Figure 14:
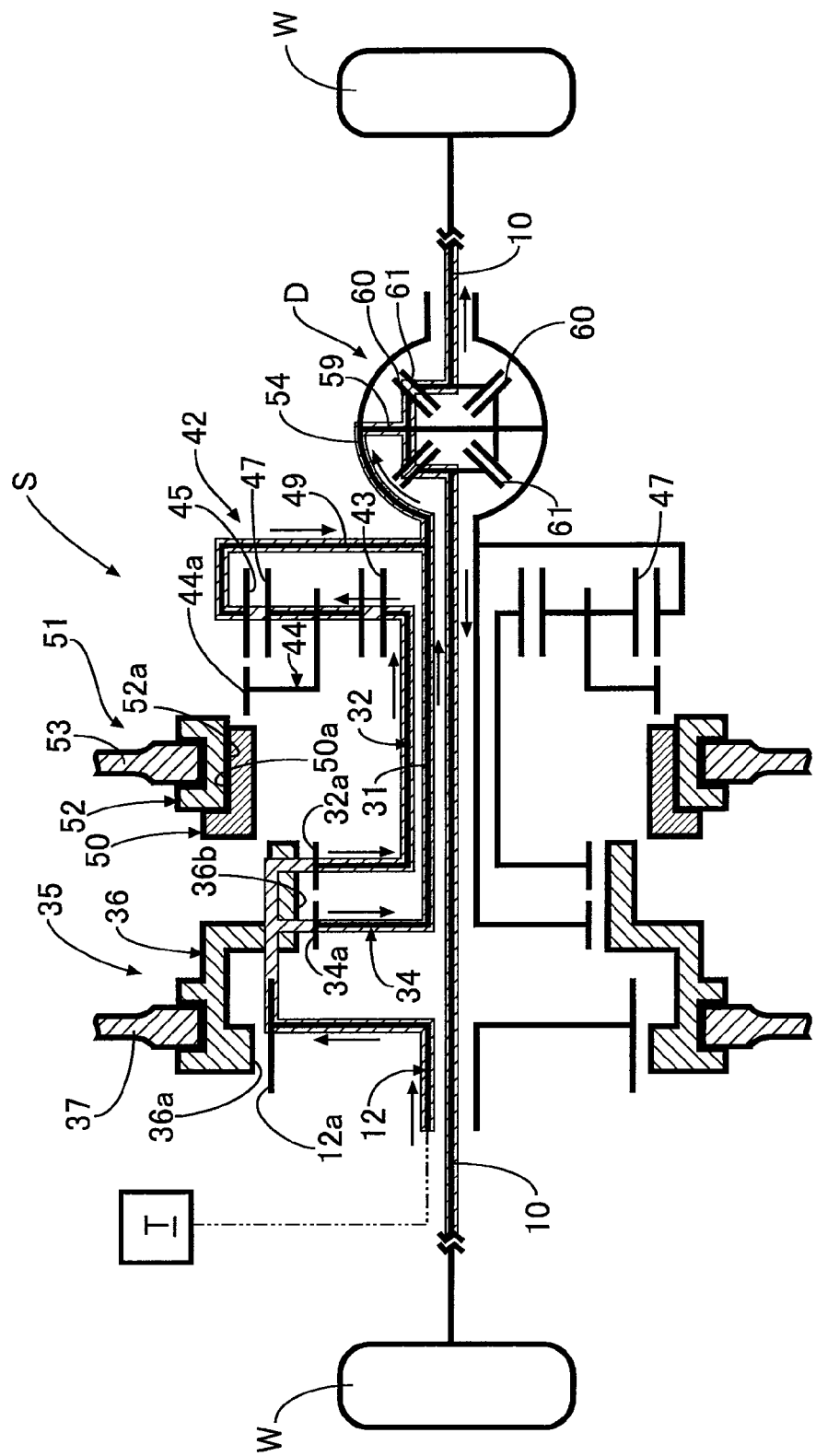
FIG. 14 is a torque flow diagram in a drive range (first embodiment).
Figure 15:
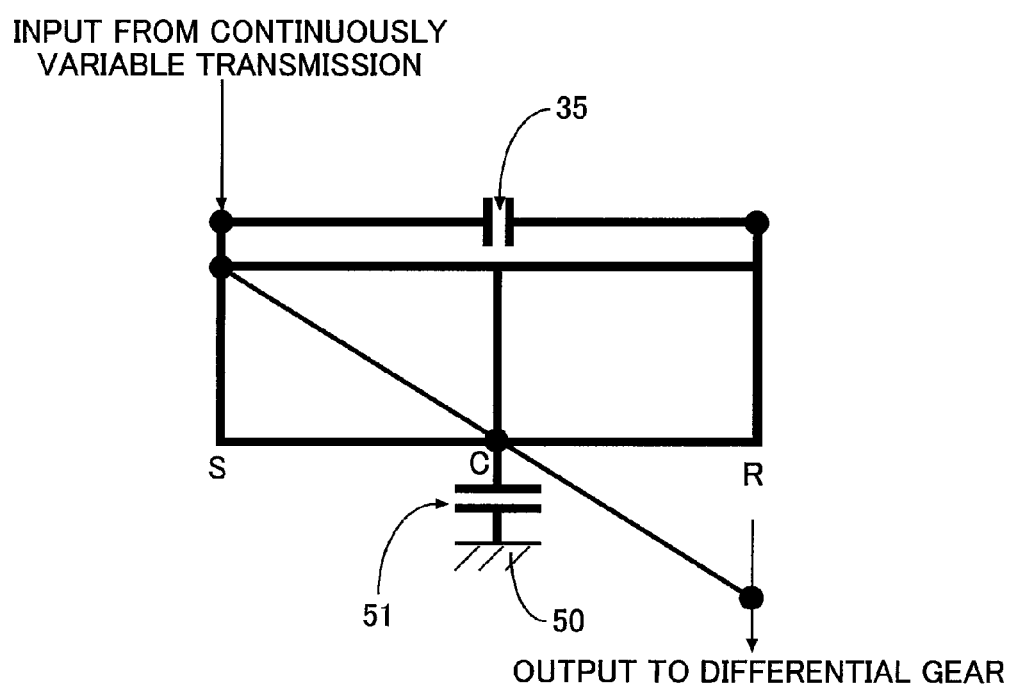
FIG. 15 is a speed diagram of a planetary gear mechanism (first embodiment).

As shown in FIG. 10 and FIG. 14, when the sleeve 36 of the first meshing switching mechanism 35 is moved to the left, the first output shaft 12, the second output shaft 31, and the third output shaft 32 are thus integrally joined, and the sleeve 52 of the second meshing switching mechanism 51 is moved to the left to thus detach the carrier 44 of the planetary gear mechanism 42 from the casing 50, the drive range is established.

In the drive range, since the first connecting member 34, which is connected to the ring gear 45 of the planetary gear mechanism 42 via the second connecting member 49 and the second output shaft 31, and the third output shaft 32, which is connected to the sun gear 43 of the planetary gear mechanism 42, are joined to each other by means of the first meshing switching mechanism 35, the planetary gear mechanism 42 attains an integrally rotatable state. As a result, the driving force outputted from the continuously variable transmission T to the first output shaft 12 is transmitted to the differential case 54 via the path: first meshing switching mechanism 35→first connecting member 34→second output shaft 31 or the path: first meshing switching mechanism 35→third output shaft 32→sun gear 43→carrier 44→ring gear 45→second connecting member 49, thus enabling the vehicle to be made to travel forward.

As hereinbefore described, since the driving force is transmitted via the one-way clutches 21, the first output shaft 12 of the transmission T of the present embodiment can rotate only in the direction of forward travel, but disposing the selector device S having a forward-reverse switch function on the downstream side of the first output shaft 12 enables the vehicle to be made to travel in reverse without hybridization in which an electric motor is provided for reverse travel.

Furthermore, when the selector device S is disposed on the downstream side of the first output shaft 12, since a large torque amplified by the transmission T is inputted into the selector device S, if an attempt were to be made to switch the range using a hydraulic clutch or an electromagnetic clutch, it would become necessary to use a large capacity hydraulic clutch or electromagnetic clutch, thus giving rise to the problem that the dimensions of the selector device S would increase. However, in accordance with the present embodiment, since the range is switched by means of the first and second meshing switching mechanisms 35 and 51 without requiring a hydraulic clutch or an electromagnetic clutch, it is possible to reduce the size and lighten the weight of the selector device S.

Furthermore, since, with regard to the planetary gear mechanism 42, the reduction ratio from the third output shaft 32 to the differential gear D is set so as to be greater than 1, the gear ratio of the reverse gear position can be acquired by the planetary gear mechanism 42. In this case, the transmission torque becomes large due to a high gear ratio in the reverse gear position, but due to the first meshing switching mechanism 35 being provided on the upstream side of the planetary gear mechanism 42, only a relatively small transmission torque, before being increased by the planetary gear mechanism 42, acts on the first meshing switching mechanism 35 and switching thereof can be carried out smoothly with a low thrust.

Moreover, since the selector device S can establish the parking range and the neutral range in addition to the drive range and the reverse range, it is possible to further reduce the size and lighten the weight of the power transmission device itself.

Furthermore, as shown in FIG. 9, the sleeve 36 of the first meshing switching mechanism 35 includes the first inner peripheral spline 36a, which meshes with the first outer peripheral spline 12a provided on the first output shaft 12, and the second inner peripheral spline 36b, which meshes with the second outer peripheral spline 34a provided on the first connecting member 34 integral with the second output shaft 31 and meshes with the third outer peripheral spline 32a provided on the third output shaft 32, and since a chamfer 36c is formed on an end part, on the first inner peripheral spline 36a side, of the second inner peripheral spline 36b, due to the wedge action of the chamfer 36c it is possible to easily engage the second inner peripheral spline 36b with the second outer peripheral spline 34a.

Moreover, since the diameter of the first inner peripheral spline 36a is larger than the diameter of the second inner peripheral spline 36b, when forming the chamfer 36c of the second inner peripheral spline 36b, it is possible to form the chamfer 36c from the first inner peripheral spline 36a side by casting or forging without interfering with the first inner peripheral spline 36a. If the first inner peripheral spline 36a and the second inner peripheral spline 36b had the same diameter, it would become necessary to machine the chamfer 36c, and a large increase in cost would not be avoided.

A case in which, while the vehicle is traveling forward, switching is carried out from the drive range shown in FIG. 14 to the neutral range shown in FIG. 13 by moving the sleeve 36 of the first meshing switching mechanism 35 to the right, and after the vehicle has coasted for a while, switching is carried out from the neutral range to the drive range again by moving the sleeve 36 of the first meshing switching mechanism 35 to the left could be considered. While the vehicle is coasting, the vehicle speed decreases, the rotational speed of the second outer peripheral spline 34a connected to the driven wheels W and W decreases, and a differential rotation occurs between itself and the second inner peripheral spline 36b of the sleeve 36, but if in order to switch to the drive range in this state the sleeve 36 is moved to the left and the first outer peripheral spline 12a and the second inner peripheral spline 36b are joined by means of the second inner peripheral spline 36b, there is the problem that the driving force of the engine E is suddenly transmitted to the driven wheels W and W and a torque shock will occur (see FIG. 15).

Furthermore, a case in which, while the vehicle is traveling in reverse, switching is carried out from the reverse range shown in FIG. 12 to the neutral range shown in FIG. 14 by moving the sleeve 52 of the second meshing switching mechanism 51 to the left, and before the vehicle has completely stopped, switching is carried out from the neutral range to the reverse range again by moving the sleeve 52 of the second meshing switching mechanism 51 to the right could be considered. If the outer peripheral spline 44a is joined via the inner peripheral spline 52a by moving the sleeve 52 to the left in order to switch to the reverse range in a state in which the vehicle is still traveling in reverse and the outer peripheral spline 44a connected to the driven wheels W and W is rotating, there is the problem that the driving force of the engine E is suddenly transmitted to the driven wheels W and W and a torque shock will occur (see FIG. 15).

In either of the above cases, since the first meshing switching mechanism 35 or the second meshing switching mechanism 51 is driven in a state in which there is differential rotation, there is a possibility that the inner peripheral spline or the outer peripheral spline will be damaged when meshing.

The present embodiment prevents torque shock from occurring by eliminating or decreasing the differential rotation of the first meshing switching mechanism 35 when switching from the drive range to the neutral range and then switching again to the drive range, and also prevents torque shock from occurring by eliminating or decreasing the differential rotation of the second meshing switching mechanism 51 when switching from the reverse range to the neutral range and then switching again to the reverse range.

Figure 16:
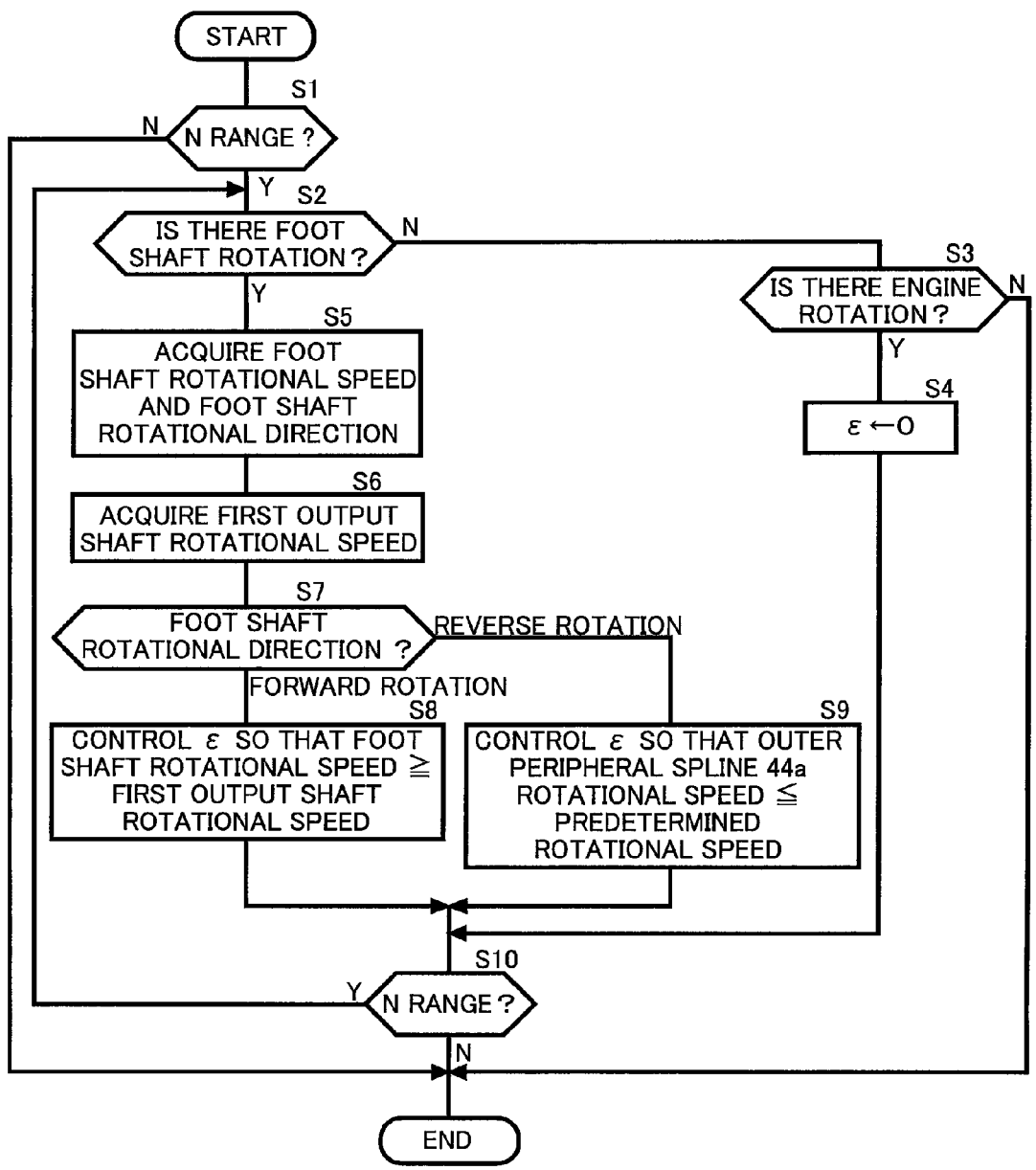
FIG. 16 is a flowchart of a torque shock reduction routine (first embodiment).

The operation thereof is explained below by reference to the flowchart of FIG. 16.

First, if the neutral range is found in step S1, then in step S2 it is determined whether or not the foot shaft is rotating, that is, whether or not the differential gear D connected to the driven wheels W and W, the second output shaft 31, the ring gear 45 of the planetary gear mechanism 42, etc. are rotating. If in step S2 there is no rotation of the foot shaft and the vehicle is in a stopped state, then if in step S3 the engine E is rotating, in step S4 the amount of eccentricity $\epsilon$ of the continuously variable transmission T is set at zero so that the rotation of the engine E is not transmitted to the first output shaft 12.

If in step S2 the foot shaft is rotating, then in step S5 the rotational speed and the rotational direction of the foot shaft are acquired using an appropriate sensor, and in step S6 the rotational speed of the first output shaft 12 is acquired using an appropriate sensor. If in step S7 the rotational direction of the foot shaft is forward rotation and the vehicle is coasting forward, then in step S8 the amount of eccentricity ϵ of the eccentric disk 18 is controlled by means of the shift actuator 14 so that the rotational speed of the foot shaft is the rotational speed of the first output shaft 12 or greater.

In this process, it is desirable that the rotational speed of the foot shaft and the rotational speed of the first output shaft 12 are made to completely coincide with each other, and in this case since there is no differential rotation between the second inner peripheral spline 36b and the second outer peripheral spline 34a of the first meshing switching mechanism 35, when switching from the neutral range to the drive range by moving the sleeve 36 to the left the occurrence of torque shock is prevented. Furthermore, if the rotational speed of the foot shaft is equal to or greater than the rotational speed of the first output shaft 12, the driving force is transmitted back from the driven wheels W and W side to the engine E side, but compared with a case in which the driving force of the engine E is transmitted to the driven wheels W and W, the torque shock can be reduced. It is desirable that the amount of eccentricity ϵ is controlled so that the differential rotation becomes as small as possible.

Furthermore, if in step S7 the rotational direction of the foot shaft is reverse rotation and the vehicle is coasting in reverse, then in step S9 the amount of eccentricity ϵ of the eccentric disk 18 is controlled by means of the shift actuator 14 so that the rotational speed (including the rotational speed in the normal direction of rotation and the rotational speed in the reverse direction of rotation) of the outer peripheral spline 44a formed on the carrier 44 of the second meshing switching mechanism 51 becomes equal to or less than a predetermined rotational speed. Since the rotational speed of the ring gear 45 of the planetary gear mechanism 42 is the rotational speed of the foot shaft, and the rotational speed of the sun gear 43 of the planetary gear mechanism 42 is the rotational speed of the first output shaft 12, it is possible, by controlling the amount of eccentricity ϵ to thus change the rotational speed of the first output shaft 12, to control the rotational speed of the outer peripheral spline 44a of the carrier 44 having the pinions 47 meshing with the ring gear 45 and the sun gear 43.

In this process, the rotational speed of the outer peripheral spline 44a is desirably zero, and in this case since there is no differential rotation between the inner peripheral spline 52a of the sleeve 52 of the second meshing switching mechanism 51 and the outer peripheral spline 44a of the carrier 44, when switching from the neutral range to the reverse range by moving the sleeve 52 to the right, the occurrence of torque shock is prevented. Even when the rotational speed of the outer peripheral spline 44a is not completely zero, if it is not greater than a predetermined rotational speed, the torque shock can be reduced, but it is desirable that the amount of eccentricity ϵ is controlled so that the rotational speed of the outer peripheral spline 44a of the carrier 44 becomes as small as possible.

If in step S10 the neutral range is not found, and shift change to the drive range or the reverse range is completed, the present routine is ended.

As hereinbefore described, in accordance with the present embodiment, while the vehicle is coasting in the neutral range, when the first meshing switching mechanism 35 or the second meshing switching mechanism 51 is operated to thus carry out shift change to the drive range or the reverse range, not only is it possible to minimize the occurrence of torque shock, but it is also possible to prevent the spline of the first meshing switching mechanism 35 or the second meshing switching mechanism 51 from meshing with a large differential rotation and being damaged.

An embodiment of the present invention is explained above, but the present invention may be modified in a variety of ways as long as the modifications do not depart from the spirit and scope thereof.

For example, the transmission of the present invention is not limited to the reciprocating type continuously variable transmission T of the embodiment, and it may be another type of continuously variable transmission such as a belt type continuously variable transmission.

Furthermore, assignment of the sun gear 43, the carrier 44, and the ring gear 45 of the planetary gear mechanism 42 to the first to third elements may be changed as appropriate.

The invention claimed is:

1. A vehicular power transmission device comprising a selector device disposed between a transmission and a differential gear,
the selector device comprising
a first output shaft connected to the transmission,
a second output shaft connected to the differential gear,
a third output shaft relatively rotatably fitted on an outer periphery of the second output shaft,
a planetary gear mechanism comprising a first element connected to the third output shaft and a second element connected to the differential gear,
a first meshing switching mechanism that is capable of switching between a state in which the first and third output shafts are joined and the second output shaft is detached and a state in which the first to third output shafts are joined, and
a second meshing switching mechanism that is capable of joining a third element of the planetary gear mechanism to a casing.

2. The vehicular power transmission device according to claim 1, wherein the transmission comprises
an input side fulcrum having a variable amount of eccentricity from an axis of an input shaft connected to a drive source and rotating together with the input shaft,
a one-way clutch connected to the first output shaft,
an output side fulcrum provided on an input member of the one-way clutch,
a connecting rod having opposite ends connected to the input side fulcrum and the output side fulcrum and moving reciprocatingly, and
a shift actuator for changing an amount of eccentricity of the input side fulcrum.

3. The vehicular power transmission device according to claim 2, wherein when the first and third output shafts are joined and the second output shaft is detached by the first meshing switching mechanism, the third element is detached from the casing by the second meshing switching mechanism, and the second output shaft is in a rotating state,
if a rotational direction of the second output shaft is a first direction, the amount of eccentricity is controlled so that a rotational speed of the first output shaft is not greater than a rotational speed of the second output shaft, and if the rotational direction of the second output shaft is a second direction, the amount of eccentricity is controlled so that the absolute value of the rotational speed of the third element is not greater than a predetermined rotational speed.

4. The vehicular power transmission device according to claim 1, wherein the first meshing switching mechanism comprises a first inner peripheral spline meshing with a first outer peripheral spline provided on the first output shaft, and a second inner peripheral spline meshing with a second outer peripheral spline provided on the second output shaft and a third outer peripheral spline provided on the third output shaft, and the first inner peripheral spline has a diameter that is larger than the diameter of the second inner peripheral spline, a chamfer being formed on an end part, on the first inner peripheral spline side, of the second inner peripheral spline.

5. The vehicular power transmission device according to claim 4, wherein the transmission comprises an input side fulcrum having a variable amount of eccentricity from an axis of an input shaft connected to a drive source and rotating together with the input shaft, a one-way clutch connected to the first output shaft, an output side fulcrum provided on an input member of the one-way clutch, a connecting rod having opposite ends connected to the input side fulcrum and the output side fulcrum and moving reciprocatingly, and a shift actuator for changing an amount of eccentricity of the input side fulcrum.

6. The vehicular power transmission device according to claim 5, wherein when the first and third output shafts are joined and the second output shaft is detached by the first meshing switching mechanism, the third element is detached from the casing by the second meshing switching mechanism, and the second output shaft is in a rotating state, if a rotational direction of the second output shaft is a first direction, the amount of eccentricity is controlled so that a rotational speed of the first output shaft is not greater than a rotational speed of the second output shaft, and if the rotational direction of the second output shaft is a second direction, the amount of eccentricity is controlled so that the absolute value of the rotational speed of the third element is not greater than a predetermined rotational speed.

7. The vehicular power transmission device according to claim 1, wherein the planetary gear mechanism has a reduction ratio from the third output shaft to the differential gear that is set to be greater than 1.

8. The vehicular power transmission device according to claim 7, wherein the first meshing switching mechanism comprises a first inner peripheral spline meshing with a first outer peripheral spline provided on the first output shaft, and a second inner peripheral spline meshing with a second outer peripheral spline provided on the second output shaft and a third outer peripheral spline provided on the third output shaft, and the first inner peripheral spline has a diameter that is larger than the diameter of the second inner peripheral spline, a chamfer being formed on an end part, on the first inner peripheral spline side, of the second inner peripheral spline.

9. The vehicular power transmission device according to claim 7, wherein the transmission comprises an input side fulcrum having a variable amount of eccentricity from an axis of an input shaft connected to a drive source and rotating together with the input shaft, a one-way clutch connected to the first output shaft, an output side fulcrum provided on an input member of the one-way clutch, a connecting rod having opposite ends connected to the input side fulcrum and the output side fulcrum and moving reciprocatingly, and a shift actuator for changing an amount of eccentricity of the input side fulcrum.

10. The vehicular power transmission device according to claim 9, wherein when the first and third output shafts are joined and the second output shaft is detached by the first meshing switching mechanism, the third element is detached from the casing by the second meshing switching mechanism, and the second output shaft is in a rotating state, if a rotational direction of the second output shaft is a first direction, the amount of eccentricity is controlled so that a rotational speed of the first output shaft is not greater than a rotational speed of the second output shaft, and if the rotational direction of the second output shaft is a second direction, the amount of eccentricity is controlled so that the absolute value of the rotational speed of the third element is not greater than a predetermined rotational speed.

* * * * *